United States Patent
James et al.

(10) Patent No.: US 8,763,059 B1
(45) Date of Patent: Jun. 24, 2014

(54) METHOD AND APPARATUS FOR CONNECTING SATELLITE RECEIVER TELEPHONE MODEMS OVER COAXIAL CABLE

(75) Inventors: Thomas H. James, Pacific Palisades, CA (US); Raynold M. Kahn, Los Angeles, CA (US); James D. Allen, Westlake Village, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1785 days.

(21) Appl. No.: 11/205,249

(22) Filed: Aug. 16, 2005

(51) Int. Cl.
*H04N 7/173* (2011.01)
*H04N 7/20* (2006.01)

(52) U.S. Cl.
USPC .............................. 725/106; 725/63

(58) Field of Classification Search
USPC .................................... 725/63, 106
See application file for complete search history.

(56) References Cited

U.S. PATENT DOCUMENTS

| | | | |
|---|---|---|---|
| 4,241,237 A | 12/1980 | Paraskevakos et al. | |
| 5,270,809 A | 12/1993 | Gammie et al. | |
| 5,488,413 A * | 1/1996 | Elder et al. | 725/106 |
| 5,505,901 A | 4/1996 | Harney et al. | |
| 5,630,204 A | 5/1997 | Hylton et al. | |
| 5,661,517 A | 8/1997 | Budow et al. | |
| 5,708,963 A | 1/1998 | Mobley et al. | |
| 5,729,824 A * | 3/1998 | O'Neill et al. | 725/106 |
| 5,793,413 A | 8/1998 | Hylton et al. | |
| 5,898,919 A | 4/1999 | Yuen | |
| 6,064,724 A | 5/2000 | Kelly | |
| 6,622,307 B1 | 9/2003 | Ho | |
| 2002/0064152 A1 * | 5/2002 | Lemley et al. | 370/352 |
| 2002/0178454 A1 * | 11/2002 | Antoine et al. | 725/106 |

FOREIGN PATENT DOCUMENTS

| | | |
|---|---|---|
| JP | 11220444 | 8/1999 |
| JP | 11284584 | 10/1999 |
| WO | WO 89/10670 | 11/1989 |
| WO | WO 99/27666 | 6/1999 |
| WO | WO 00/30354 | 5/2000 |

* cited by examiner

*Primary Examiner* — Nasser Goodarzi
*Assistant Examiner* — Hyun Hong

(57) ABSTRACT

A method and apparatus for coupling an Integrated Receiver Decoder (IRD) to a telephone line via a coaxial cable used for delivering direct broadcast satellite signals to the IRD. One embodiment comprises a port coupler, coupled to a telephone line and to the coaxial cable, and a client unit, coupled between the port coupler and the IRD, wherein the port coupler connects the IRD to the direct broadcast satellite signals and connects the IRD to the phone line via the client unit, and at least satellite signals, satellite control signals, telephone data signals, and telephone system protocol signals travel on the coaxial cable between the client unit and the port coupler.

19 Claims, 8 Drawing Sheets

METHOD AND APPARATUS FOR CONNECTING SATELLITE RECEIVER TELEPHONE MODEMS OVER COAXIAL CABLE

BACKGROUND OF THE INVENTION

1. Field of the Invention

The present invention relates generally to a satellite receiver system, and in particular, to a method and apparatus for connecting satellite receiver modems over coaxial cable.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to four IRDs on separate cables from a multiswitch.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the+ received signals to IRD 112, which decodes the signals and separates the signals into viewer channels, which are then passed to television 114 for viewing by a user.

Satellite uplink signals 116 are transmitted by an uplink facility 118 to the satellites 102-104 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Each satellite 102-106 broadcasts downlink signals 120 in thirty-two (32) different frequencies, which are licensed to various users for broadcasting of programming, which can be audio, video, or data signals, or any combination. These signals are typically located in the Ku-band of frequencies, i.e., 11-18 GHz. Future satellites will likely broadcast in the Ka-band of frequencies, i.e., 18-40 GHz, but typically 20-30 kHz.

FIG. 2 illustrates a typical ODU of the related art.

ODU 108 typically uses reflector dish 122 and feedhorn assembly 124 to receive and direct downlink signals 120 onto feedhorn assembly 124. Reflector dish 122 and feedhorn assembly 124 are typically mounted on bracket 126 and attached to a structure for stable mounting. Feedhorn assembly 124 typically comprises one or more Low Noise Block converters 128, which are connected via wires or coaxial cables to a multiswitch, which can be located within feedhorn assembly 124, elsewhere on the ODU 108, or within house 110. LNBs typically downconvert the Ku-band and Ka-band downlink signals 120 into frequencies that are easily transmitted by wire or cable, which are typically in the L-band of frequencies, which typically ranges from 950 MHz to 2150 MHz. This downconversion makes it possible to distribute the signals within a home using standard coaxial cables.

The multiswitch enables system 100 to selectively switch the signals from SatA 102, SatB 104, and SatC 106, and deliver these signals via cables 124 to each of the IRDs 112A-D located within house 110. Typically, the multiswitch is a five-input, four-output (5×4) multiswitch, but can also be a 6×8 multiswitch, where two inputs to the multiswitch are from SatA 102, two inputs to the multiswitch are from SatB 104, and one input to the multiswitch is from SatC 106. SatC 106 typically delivers local programming to specified geographic areas.

To maximize the available bandwidth in the Ku-band of downlink signals 120, each broadcast frequency is further divided into polarizations. Each LNB 128 can only receive one polarization at time, so by aligning polarizations between the downlink polarization and the LNB 128 polarization, downlink signals 120 can be selectively filtered out from travelling through the system 100 to each IRD 112A-D.

IRDs 112A-D use a one-way communications system to control the multiswitch. Each IRD 112A-D has a dedicated cable 124 connected directly to the multiswitch, and each IRD independently places a voltage and signal combination on the dedicated cable to program the multiswitch. For example, IRD 112A may wish to view a signal that is provided by SatA 102. To receive that signal, IRD 112A sends a voltage/tone signal on the dedicated cable back to the multiswitch, and the multiswitch delivers the satA 102 signal to IRD 112A on dedicated cable 124. IRD 112B independently controls the output port that IRD 112B is coupled to, and thus may deliver a different voltage/tone signal to the multiswitch. The voltage/tone signal typically comprises a 13 Volts DC (VDC) or 18 VDC signal, with or without a 22 kHz tone superimposed on the DC signal. 13 VDC without the 22 kHz tone would select one port, 13 VDC with the 22 kHz tone would select another port of the multiswitch, etc. The voltage/tone signal can also be a modulated tone with a voltage, such that more than four ports can be used and uniquely selected.

Further, some of the programs that are broadcast by SatA 102, SatB 104, and SatC 106 are "pay-per-view" programs, that are enabled and disabled through programming of the IRD 112. Typically, a customer will use a remote control to program the IRD 112, which then places a phone call to a customer service control point to enable a specific IRD 112 to decode the signals present on the pay-per-view channel.

Further, in some installations, each IRD 112 must be coupled to a phone line to enforce contractual blackout requirements, or for security reasons to assist in locating the IRD 112.

However, such services require that at least one, and possibly all of the IRDs 112 be installed physically proximate to the subscriber's television set and also require that the IRD 112 be installed such that a telephone line can be connected to the IRD 112. In some installations, new telephone lines must be run to the location within house 110 where the IRD 112 is located for the pay-per-view service to be activated. This increases the complexity and the cost of IRD 112 installation, and, in some circumstances, make it impossible to install an IRD 112 in a desired location because of the difficulty of running a telephone line to the desired location.

Other attempts at using internal house power lines to distribute telephone signals have been proposed, but the bandwidth of these systems cannot handle the other requirements that are necessary for the integration of satellite signal system distribution with such systems.

It can be seen, then, that there is a need in the art for a satellite broadcast system that can be easily installed in any location in a home. It can also be seen that there is a need in the art for a satellite broadcast system that utilizes pre-existing household telephone wiring to minimize cost and increase flexibility in arrangement of the system components.

SUMMARY OF THE INVENTION

To minimize the limitations in the prior art, and to minimize other limitations that will become apparent upon reading and understanding the present specification, the present invention discloses a method and apparatus for coupling an Integrated Receiver Decoder (IRD) to a telephone line via a coaxial cable used for delivering direct broadcast satellite signals to the IRD. An apparatus in accordance with the present invention comprises a port coupler, coupled to a telephone line and to the coaxial cable, and a client unit, coupled between the port coupler and the IRD, wherein the port coupler connects the IRD to the direct broadcast satellite signals and connects the IRD to the phone line via the client unit, and at least satellite signals, satellite control signals, telephone data signals, and telephone system protocol signals travel on the coaxial cable between the client unit and the port coupler.

Other features and advantages are inherent in the system and method claimed and disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Overview

Currently, IRD installation requires that each IRD be connected to a telephone line. However, such installations are costly and difficult. The present invention provides distribution of the telephone signals over the coaxial cable that is run to each IRD from the multiswitch, and provides a coupler to connect each IRD to a single telephone connection.

The system of the present invention operates by directly coupling the baseband telephone signals onto the coax for communication from the IRD modem via a client unit and from there to a port coupler and then onto the telephone line. The port coupler and client units must communicate on and off hook conditions to each other by some mechanism other than the normal dc voltage and current line conditions, because dc voltage is used for other control within the system. Further, the system of the present invention can use a legacy IRD with an add-on box to allow for previous versions of similar systems to be used with the present invention.

System Block Diagram

Figure 1:
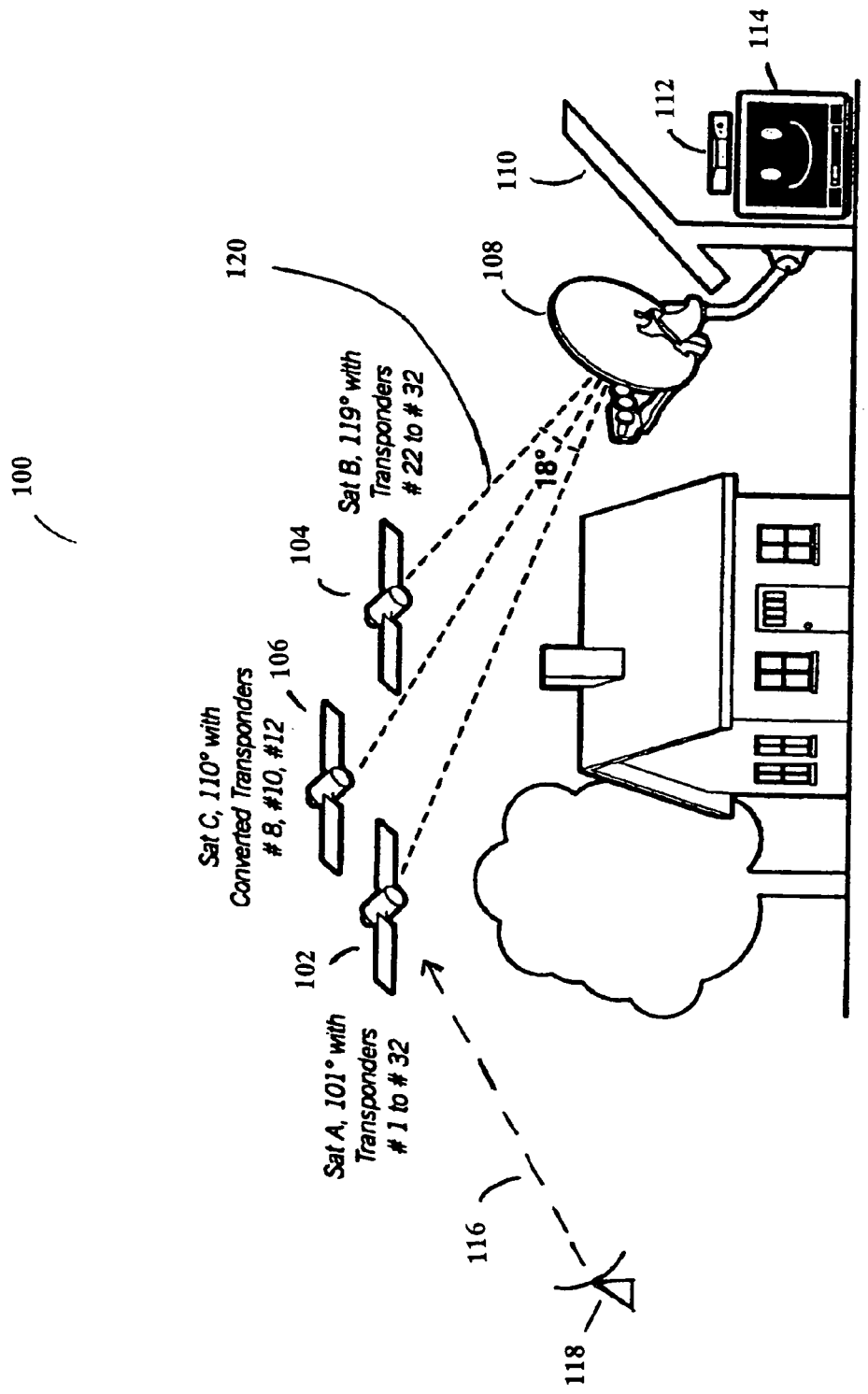
FIG. 1 illustrates a typical satellite television installation of the related art.
Figure 2:
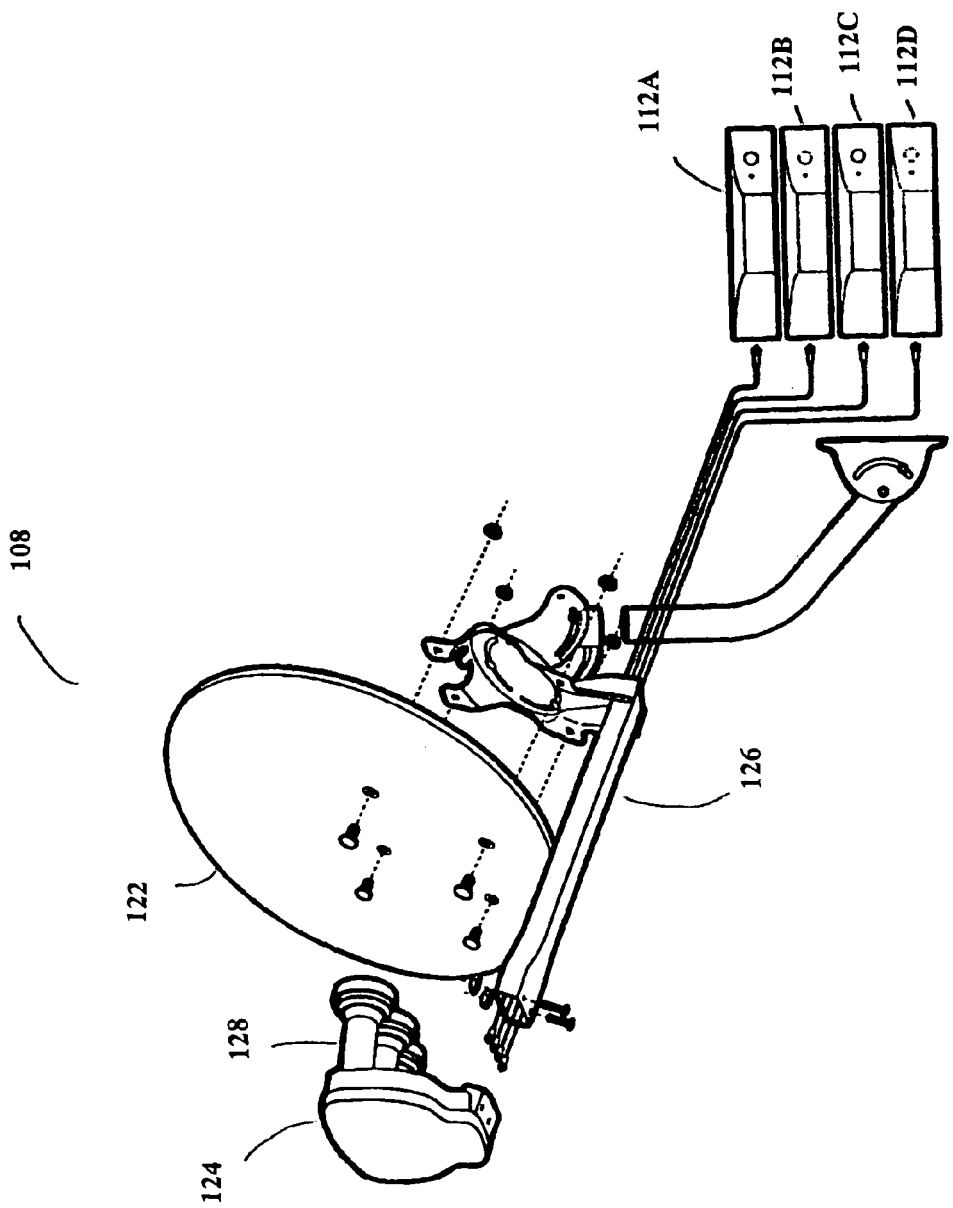
FIG. 2 illustrates a typical ODU of the related art.
Figure 3:
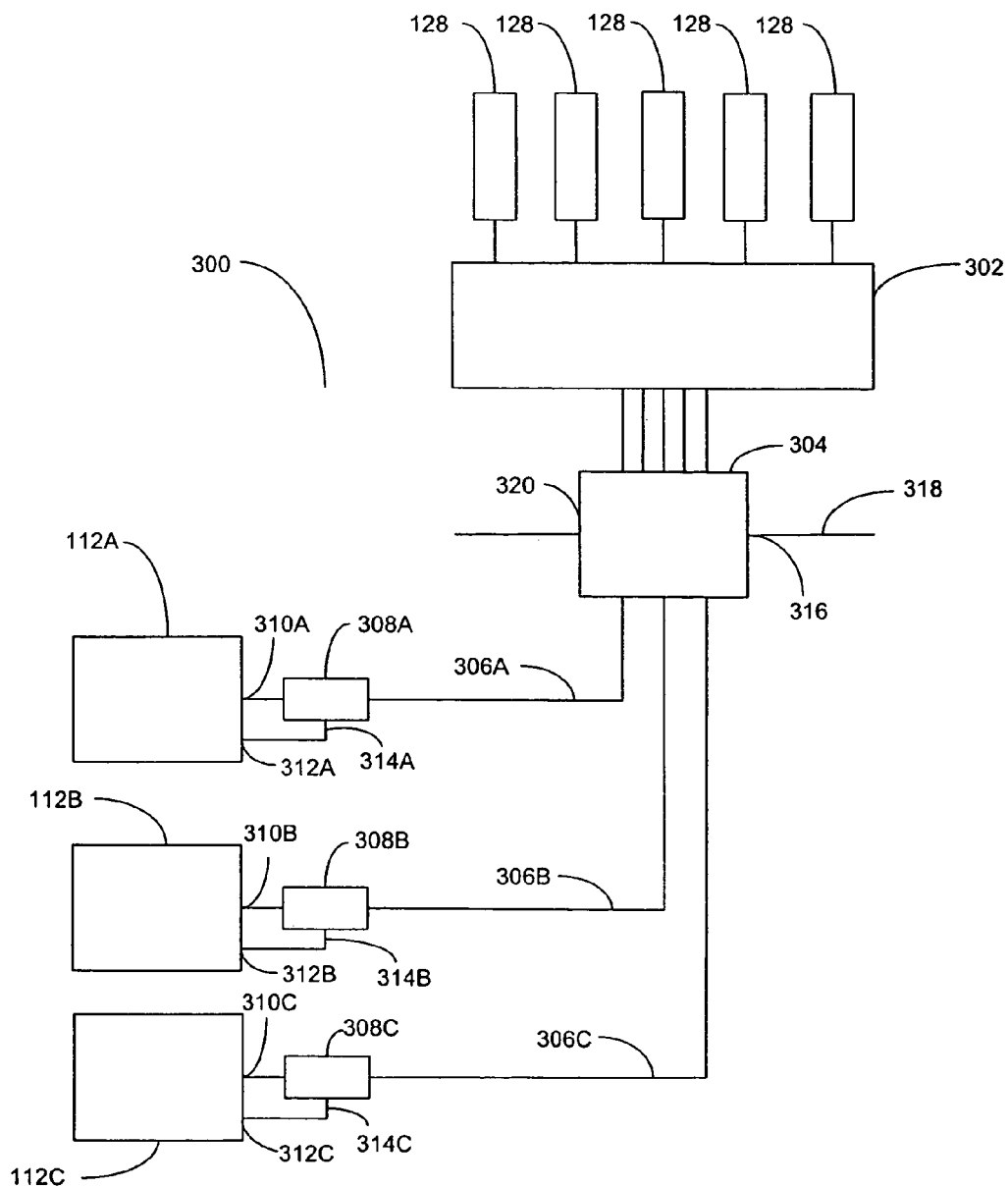
FIG. 3 illustrates a system diagram of the present invention.

FIG. 3 illustrates a block diagram of the present invention.

System 300 shows LNBs 128 coupled to multiswitch 302. Multiswitch 302 is in turn coupled to port coupler 304. Dedicated cables 306A-C are used to connect the port coupler 304 to client units 308A-C respectively, which are coupled to individual IRDs 112A-C located at various locations within a given installation.

As in the related art, each IRD 112A-C can control which satellite downlink signal 120 is present on the dedicated cables 306A-C. Ports 310A-C are the satellite downlink signal 120 inputs to the IRDs 112A-C. For example, and not by way of limitation, IRD 112A may wish to view a signal which is present in SatA 102 downlink signal 120, while IRD 112B may wish to view a signal which is present on SatB 104 downlink signal 120. IRD 112A sends a voltage and tone (either 13 or 18 Volts DC (VDC), and with or without a 22 kHz tone signal) signal from port 310A back to multiswitch 302, such that the signal present on cable 306A contains the desired signal for IRD 112A. Similarly, IRD 112B sends a different voltage and tone signal from port 310B back to multiswitch 302, so that the signal on cable 306B contains the desired signal for IRD 112B.

The present invention allows additional signals to travel back to port coupler 302 from each of the IRDs 112A-C such that all IRDs 112A-C present at a given location use only one telephone connection. The phone ports 312A-C are coupled to client units via pigtails 314A-C, and the signals that are routed to and from the modems present in IRDs 112A-C travel via cables 306A-C back to port coupler 302. Port coupler comprises a phone connection port 316 such that cable 318 can be connected to a single phone line present in the house. Since port coupler 302 is not restricted as to location, e.g., not required to be near a given television set within the home, not required to be near the ODU 108, etc., any wiring needed to couple port coupler 302 to the telephone system via cable 318 is minimized compared to the related art. The present invention uses a single phone cable 318 to connect all of the IRDs 112A-C present in a single location to the telephone system, rather than running several phone line connections to each IRD 112A-C as in the related art.

Further, port coupler 302 has a cascade port 320 so that as an installation in a given location expands, multiple port couplers 302 can communicate between each other, and each IRD 112A-C can access cable 318, regardless of which port coupler 302 they are connected to.

Signal Spectrum

Figure 4:
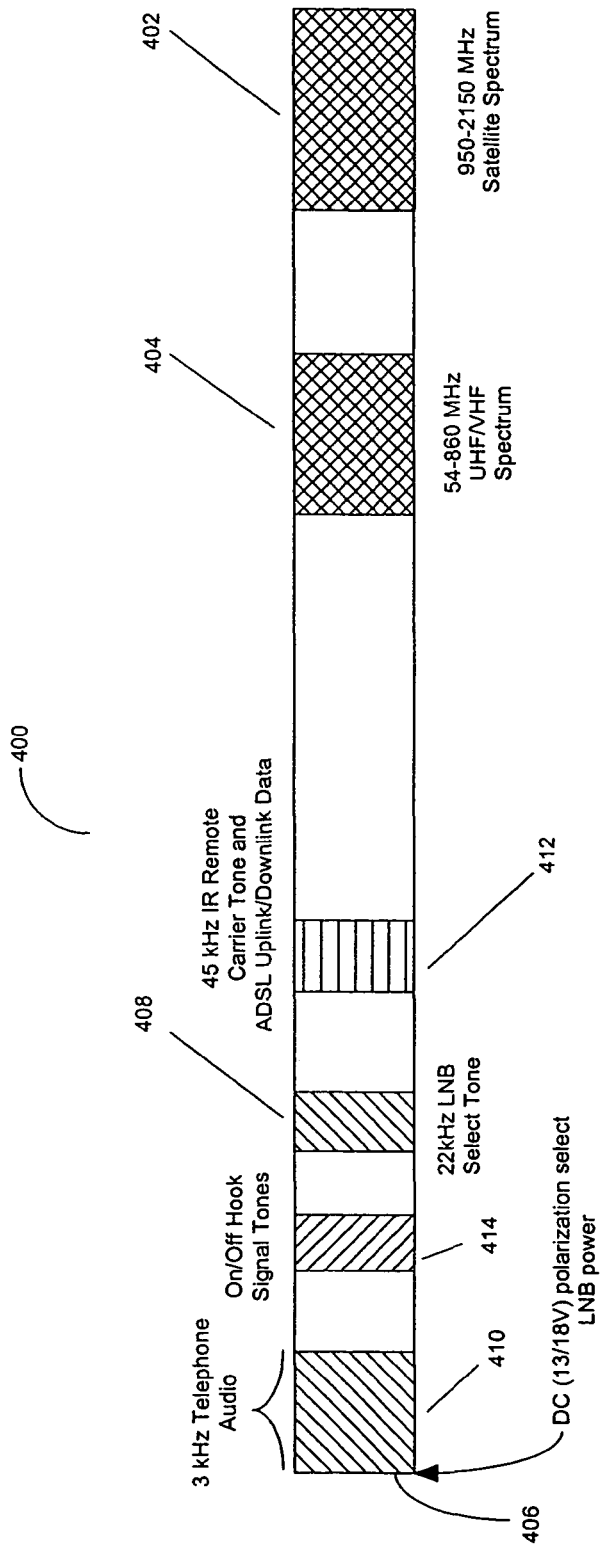
FIG. 4 illustrates the signal spectrum used on the coaxial cable within the present invention.

FIG. 4 illustrates the signal spectrum used on the coaxial cable within the present invention.

On each of the dedicated cables 306A-306C, signals of various frequencies must travel between IRDs 112A-C and port coupler 304 without interference such that messages can travel between each IRD 112A-C and port coupler 304. Spectrum 400 illustrates how the frequencies are used on the dedicated cables 306A-C. Although shown with specific locations for the spectrum 400, other locations for each of the signals can be used without departing from the scope of the present invention.

Within system 300, satellite downlink signals 120 are located within the spectrum 402, which is typically between 950 and 2150 MHz. Standard UHF/VHF television channels, which also may be present on dedicated cables 306A-C, are in spectrum 404, which is typically between 54 and 860 MHz.

Control signals from IRDs 112A-C to multiswitch 302, as well as power for LNBs 128, are at DC, shown as signals 406. Other control signals, such as the 22 kHz tone signal used for LNB 128 selection, are located in spectrum 408.

Other signals are present on dedicated cables 306A-C that are not generated by the satellite system. Standard telephone voice signals are between 0 and 3400 Hz, shown as signals 410. Asynchronous Digital Subscriber Line (ADSL) signals, and a 45 kHz Infrared (IR) remote carrier tone, are also located on dedicated cables 306A-C, typically in the 38-1104 kHz spectrum 412. Data introduced via the present invention cannot interfere with these signals 402-412.

However, the system 300 must have a way to inform the IRDs 112 and port coupler 304 about when the telephone line is on-hook (available) or off-hook (unavailable) so that pay-per-view services can be ordered or other functions performed. As such, the system of the present invention can utilize spectrum 414 to perform that function and transfer these "telephone system protocol signals" between IRD 112 and port coupler 304. Although shown as being between spectrum 410 and 408, spectrum 414 can reside anywhere within spectrum 400 without departing from the scope of the present invention.

Port Coupler

Figure 5:
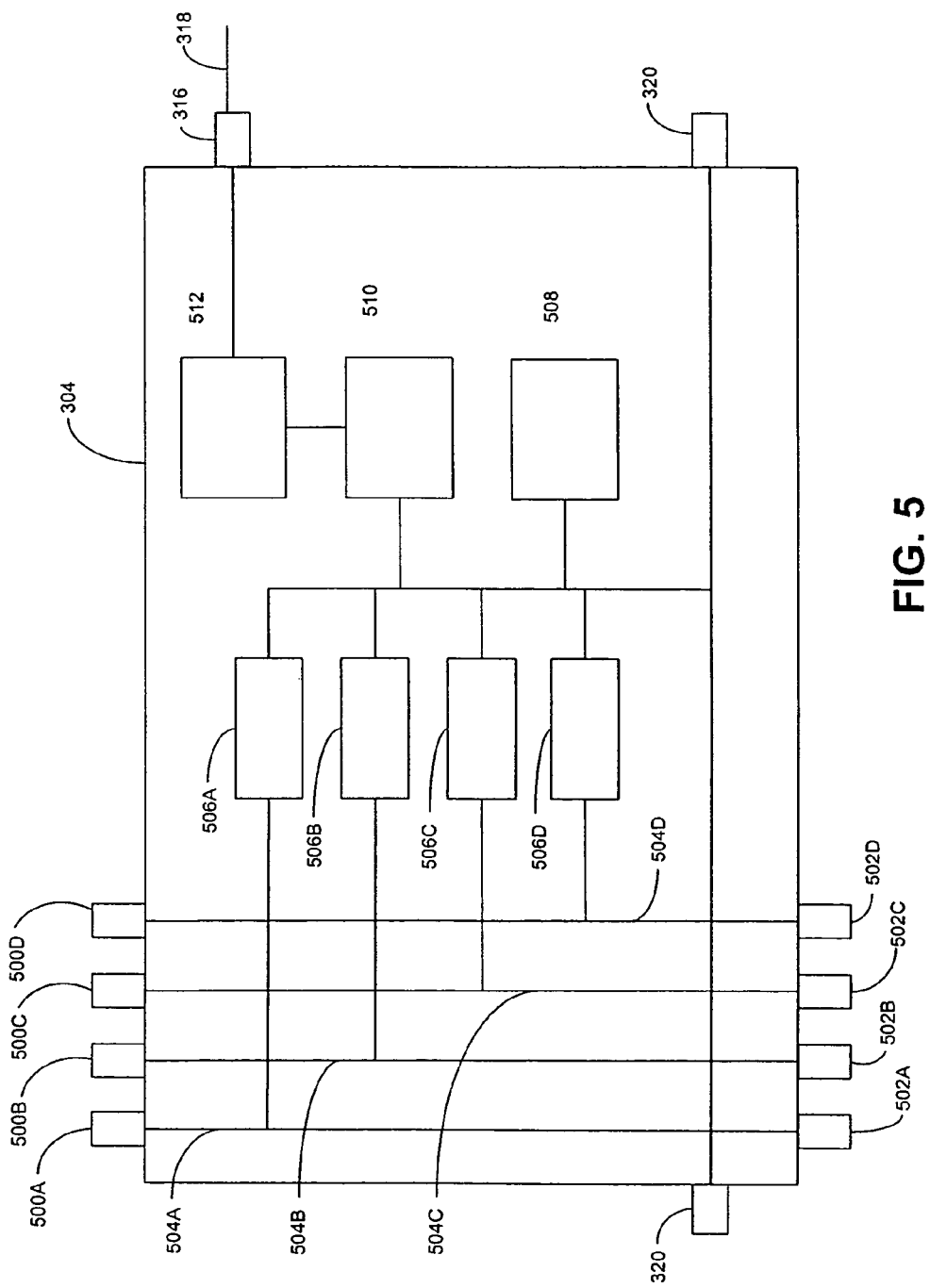
FIG. 5 is a block diagram of a port coupler in accordance with the present invention.

FIG. 5 is a block diagram of a port coupler in accordance with the present invention.

Currently the distribution of satellite downlink signals are electrically isolated from each other, which is required because the current protocol to communicate from the LNBs to the multiswitch does not work in a shared environment, because different IRDs need access to different satellite downlink signals simultaneously.

Because of this, the port coupler 304 is required to communicate the telephone signals in a shared environment which does not interfere with the satellite distribution spectrum from one satellite feed to another, while maintaining separate communication channels for the signaling protocols and the satellite signals.

As shown in FIG. 5, port coupler 304 has pass-through ports 500A-D and 502A-D, and wires 504A-D. Ports 500 are coupled to the multiswitch 302, while ports 502 are individually coupled to the IRDs 112. The RF spectrum 402 and commands 406 thus can pass between multiswitch 302 and IRDs 112, using ports 500A-D, ports 502A-D, and wires 504A-D, without interruption or operational differences from the related art.

However, port coupler 304 also comprises line couplers 506A-D which individually couple the wires 504A-D to the telephone system. Line couplers 506A-D typically contain a filter that filters out the spectrum 402 and a DC block to allow commands 406 to be communicated from IRD 112 to multi-switch 302. However, the spectrum 410 shown in FIG. 4 can be used to communicate along the cables 306, and spectrum 414 can be injected along wires 504A-D to communicate telephone on-hook/off-hook conditions to IRDs 112. An on-hook condition indicates that the telephone line 318 is available for use by port coupler 304, and an off-hook condition indicates that the telephone line 318 is in use by another telephone and not available for use by port coupler 304.

The on-hook/off-hook signaling logic and tones are generated by signaling device 508. The telephone line 318 is conditioned by line conditioner 510, and access to the telephone line 318 is controlled by line switch 512. Additional benefits of having a single telephone connection 316 to the port coupler 304 is that additional telephone line conditioning and surge protection can be added by line conditioner 510 at a common point, which adds protection to the IRDs 112 within the household 110. The additional line conditioning helps legacy IRDs 112 and modems perform better in substandard telephone systems.

Line switch 512 is a standard telephone connection that detects telephone on-off conditions and loop currents, and signaling device 508 translates the conditions into tones which are used by client unit 308 and translated back into telephone voltages and currents for use by IRD 112. This translation of the standard DC voltages used to signify on-hook/off-hook conditions into tones that can be understood by the IRDs 112 is beneficial because the on-off hook signals will not interfere with other IRD 112 communication signals, since the DC voltages typically used by the telephone system to indicate on-hook and off-hook conditions would typically interfere with the IRD 112/multiswitch 302 communication.

Cascade ports 320 are shown to allow multiple port couplers 304 to be connected to a single phone connection 316, as well as allowing additional IRDs 112 to be connected to multiswitch 302 via ports 500 and 502. A port coupler 304 may have more than four ports 500A-D/502A-D or fewer ports than shown in FIG. 5 without departing from the scope of the present invention.

Client Unit

Figure 6:
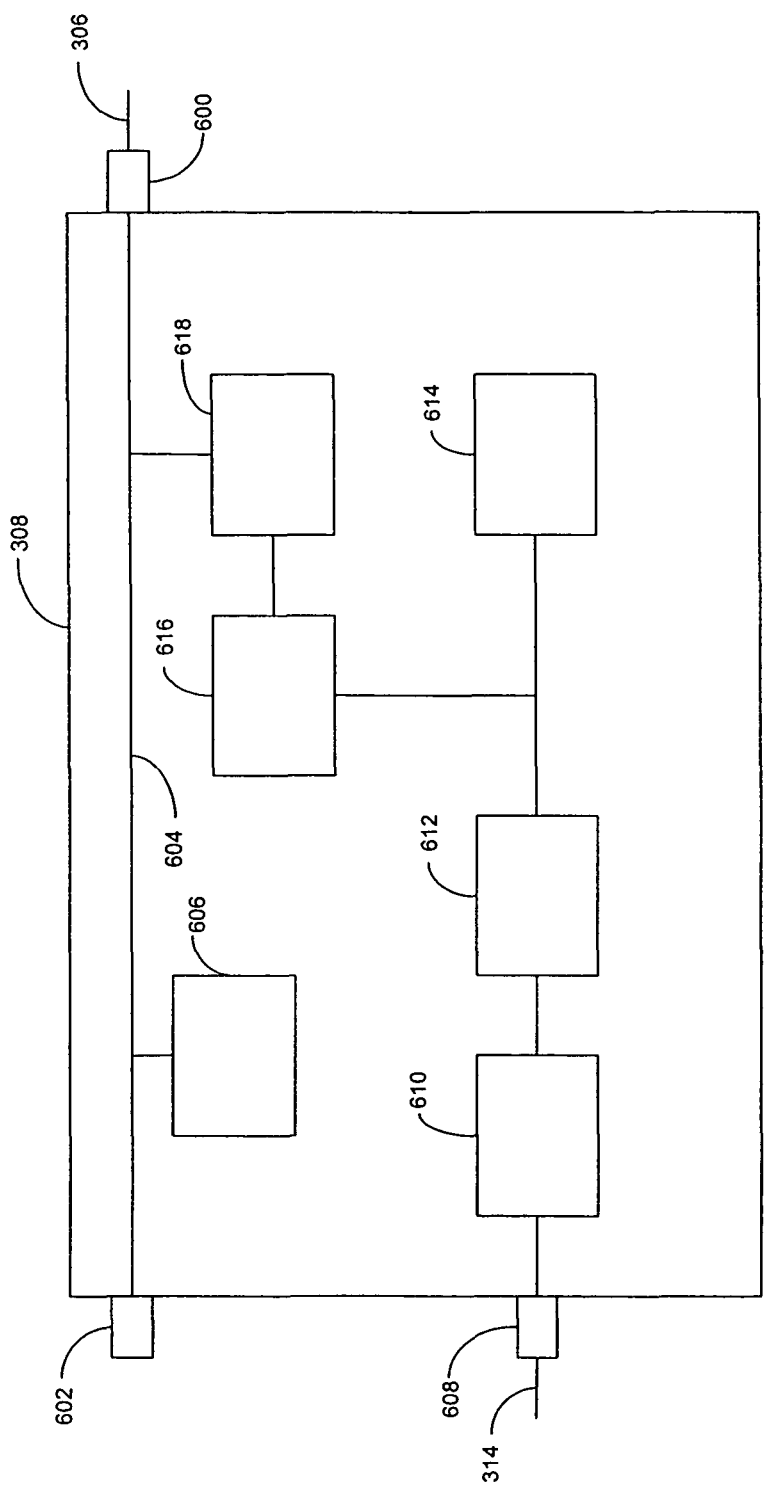
FIG. 6 illustrates a block diagram of a client unit in accordance with the present invention.

FIG. 6 illustrates a block diagram of a client unit in accordance with the present invention.

The client unit 308 couples the IRD 112 modem connection onto the satellite distribution cable 306 while still allowing satellite signal distribution on cable 306 from multiswitch 302 to IRD 112.

As shown in FIG. 6, cable 306 couples to port 600, which passes satellite signal spectrum 402 and DC spectrum 406 to port 602, which couples to the IRD 112 RF input. Signal path 604 allows client unit 308 to receive power from IRD 112 into power conditioner 606. Since the power requirements for the client unit 308 are small, the client unit 308 can be self-powered, i.e., powered through the connection 602 to the IRD 112 via power conditioner 606.

Client unit also comprises port 608 which couples to the IRD 112 modem port via pigtail 314. Through port 608, the client unit 308 emulates a standard telephone connection for the IRD 112 modem port. This emulation includes providing voltage and current control to the IRD 112 modem port to create standard on/off hook conditions. No ringing signal is required since the IRD 112 modem is never required to receive an incoming call. To perform this emulation, client unit 308 comprises a line switch 610, a line coupler 612, a hook signaler 614, a filter 616, and a DC block 618.

The line switch 610 is similar to line switch 512 in port coupler 304, in that line switch 610 acts as the interface between the standard protocol used on the telephone lines to indicate on-hook and off-hook conditions and the protocol used within the present invention to indicate on-hook and off-hook conditions. For example, and not by way of limitation, line switch 610 converts a 6-9 VDC signal, which indicates an off-hook condition for the IRD 112 that client unit 308 is coupled to, to a tone signal that is used within the system 300 of the present invention to indicate to port coupler 304 and other client units 308 that the phone line 318 is unavailable for use by other IRDs 112.

The line coupler 612 is similar to line coupler 506 of port coupler 304. The line coupler 612 couples the telephone data signals with the on-hook and off-hook signals generated by hook signaler 614 for communication between client unit 308 and port coupler 304.

The hook signaler 614 generates the on-hook and off-hook signals for the client unit 308.

The filter 616 blocks out the spectrum except for the tones generated by the port coupler 304 that are used to signal on-hook and off-hook conditions, and the 3 kHz bandwidth used for data communication over telephone lines.

The DC block 618 blocks the DC commands used by IRD 112 and the DC signals used by the IRD 112 modem so the two different DC signal paths do not interfere with each other.

Client unit 308 can be integrated into IRD 112 if desired without departing from the scope of the present invention. Further, port coupler 304 can be integrated into multiswitch 302 without departing from the scope of the present invention.

State Transitions

Figure 7:
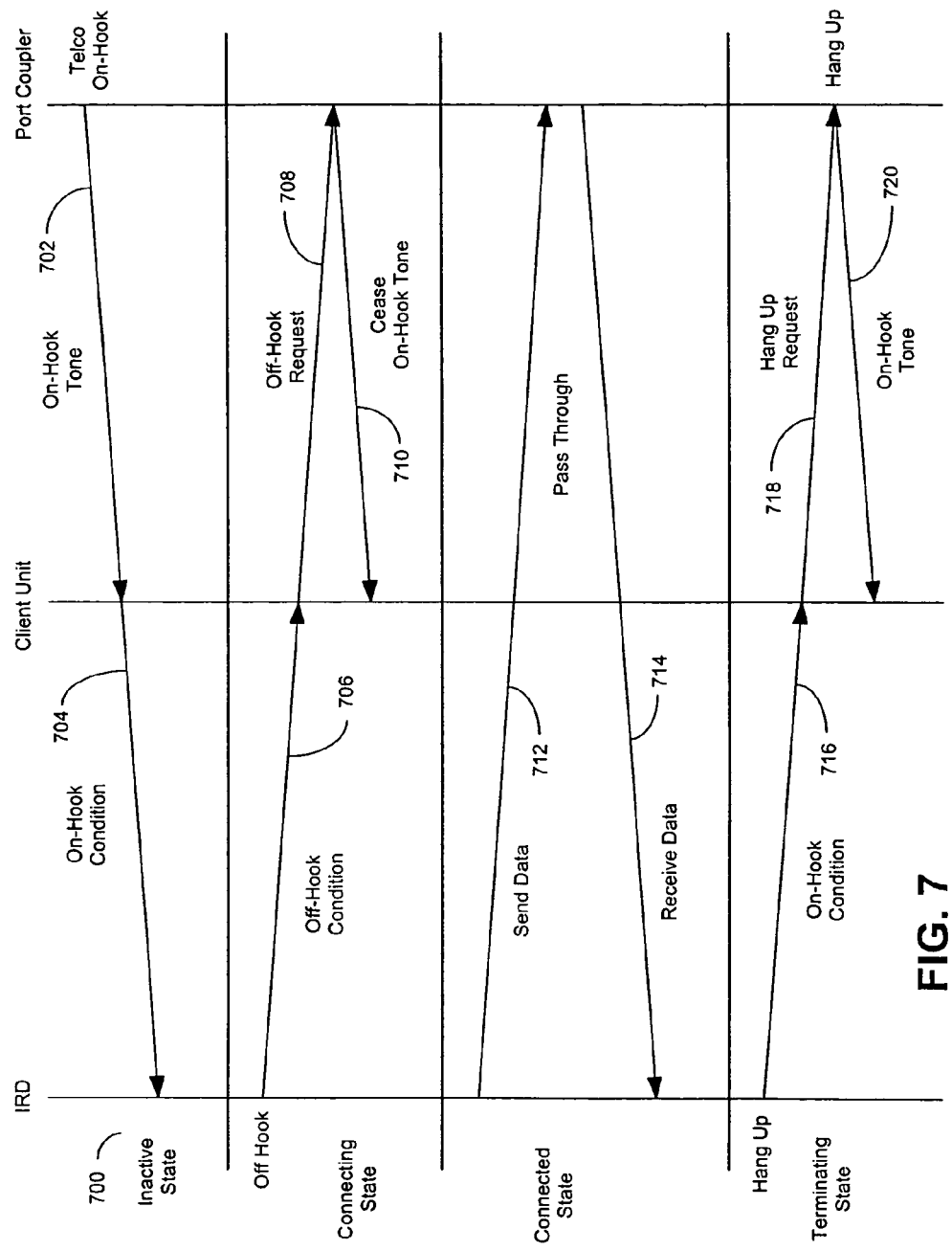
FIG. 7 illustrates a state transition diagram in accordance with the present invention.

FIG. 7 illustrates a state transition diagram in accordance with the present invention.

Inactive State

In inactive state 700, all the telephones in the household are on-hook (not being used). In inactive state 700, the port coupler 304 produces an on-hook tone 702 on the coaxial line 306. The client units 308 detect the on-hook tone 702 from port coupler 304 and produce the standard on-hook condition 704 on the modem interface connected to the IRD 112 modems. Normally, a standard on-hook condition protocol is an open loop voltage of 30-40 VDC.

If a telephone in the household is off-hook, the port coupler 304 will cease the on-hook tone 702, and all the client units 308 will detect this and produce an off-hook condition 706 to the IRDs 112 connected to client units 308. The off-hook condition protocol is normally a 6-9 VDC voltage.

Connecting State

When IRD 112 detects the on-hook tone 702 via the modem interface, the IRD 112 may connect to the phone line, because on-hook tone 702 indicates that no other phone is using the phone line. To do this, the IRD 112 modem will create an off-hook condition 706 on the IRD 112 modem to client unit 308 interface. This is normally a switch closure causing current to flow through the IRD 112 modem loop and a subsequent line voltage drop.

The client unit 308 detects the voltage drop and/or current flow and signals the port coupler 304 to also go off-hook via off-hook request 708. The port coupler 304 then ceases the on-hook tone in step 710, and connects IRD 112 that generated the off-hook condition 706 to the telephone line 318. When port coupler 304 ceases the on-hook tone in step 710, this indicates to all other IRDs 112 connected to port coupler 304 that telephone line 318 is being used, and that any communications they would like to have using telephone line 318 are temporarily not possible. This is similar to having another telephone in the household generate an off-hook signal.

Connected State

At this point, the IRD 112 modem is connected to the telephone line 318 and is free to tone dial using DTMF signaling, connect to a remote modem, or detect a busy signal. Once the IRD 112 modem has formed a connection to a remote modem, the normal modem transmission 712 and reception 714 of data can take place.

Terminating State

When the IRD 112 modem is finished with data transfer 712 and reception 714, IRD 112 modem will hang up and create an on-hook condition 716 on the interface to the client unit 308. When the client unit 308 detects on-hook condition 716, client unit 308 sends a hang up request 718 to port coupler 304 which then re-establishes the on-hook condition 720 on the coax to the other IRDs 112 to inform the other IRDs 112 that the telephone line 318 is available for use.

Flowchart

Figure 8:
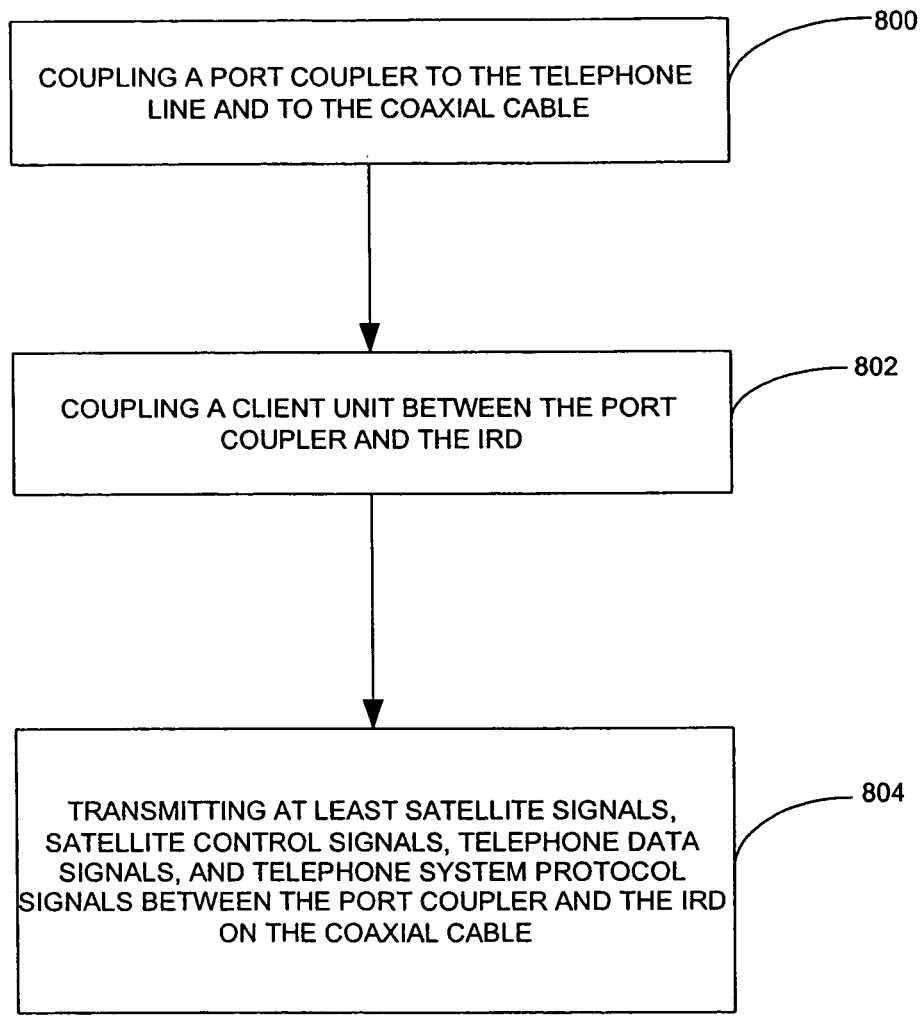
FIG. 8 is a flowchart illustrating the steps used in performing the present invention.

FIG. 8 is a flowchart illustrating the steps used in performing the present invention.

Box 800 represents coupling a port coupler to the telephone line and to the coaxial cable.

Box 802 represents coupling a client unit between the port coupler and the IRD.

Box 804 represents transmitting at least satellite signals, satellite control signals, telephone data signals, and telephone system protocol signals between the port coupler and the IRD on the coaxial cable.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

The present invention discloses a method and apparatus for coupling an Integrated Receiver Decoder (IRD) to a telephone line via a coaxial cable used for delivering direct broadcast satellite signals to the IRD. An apparatus in accordance with the present invention comprises a port coupler, coupled to a telephone line and to the coaxial cable, and a client unit, coupled between the port coupler and the IRD, wherein the port coupler connects the IRD to the direct broadcast satellite signals and connects the IRD to the phone line via the client unit, and at least satellite signals, satellite control signals, telephone data signals, and telephone system protocol signals travel on the coaxial cable between the client unit and the port coupler.

It is intended that the scope of the invention be limited not by this detailed description, but rather by the claims appended hereto and the equivalents thereof. The above specification, examples and data provide a complete description of the manufacture and use of the composition of the invention. Since many embodiments of the invention can be made without departing from the spirit and scope of the invention, the invention resides in the claims hereinafter appended and the equivalents thereof.

What is claimed is:

1. An apparatus for coupling an Integrated Receiver Decoder (IRD) to a telephone line via a coaxial cable used for delivering direct broadcast satellite signals to the IRD, comprising:
   a port coupler, coupled to a telephone line and to the coaxial cable; and
   a client unit, coupled between the port coupler and the IRD; wherein
   the port coupler connects the IRD to the direct broadcast satellite signals and connects the IRD to the phone line via the client unit, and
   at least downconverted direct broadcast satellite signals in a first frequency band, satellite control signals in a second frequency band, telephone data signals in a third frequency band, and telephone system protocol signals in a fourth frequency band travel on the coaxial cable between the client unit and the port coupler, wherein the telephone system protocol signals are translated to the fourth frequency band from at least a portion of the second frequency band when the telephone system protocol signals are present on the coaxial cable.

2. The apparatus of claim 1, wherein a plurality of IRDs are coupled to the telephone line by the port coupler, each of the IRDs having an associated client unit coupled between the IRD and the port coupler.

3. The apparatus of claim 2, wherein the telephone system protocol signals travelling on the coaxial cable are translated to avoid interference with the satellite control signals travelling on the coaxial cable.

4. The apparatus of claim 3, wherein the client unit is integrated with the IRD.

5. The apparatus of claim 3, wherein the port coupler is integrated with a multiswitch used for distributing the direct broadcast satellite signals.

6. The apparatus of claim 3, wherein the telephone system protocol signals are translated from direct current voltage to a frequency range.

7. The apparatus of claim 6, wherein the frequency range is centered at 15 kilohertz.

8. A method for coupling an Integrated Receiver Decoder (IRD) to a telephone line via a coaxial cable used for delivering direct broadcast satellite signals to the IRD, comprising:
   coupling a port coupler to the telephone line and to the coaxial cable;
   coupling a client unit between the port coupler and the IRD; and
   transmitting at least downconverted direct broadcast satellite signals in a first frequency band, satellite control signals in a second frequency band, telephone data signals in a third frequency band, and telephone system protocol signals in a fourth frequency band between the port coupler and the IRD on the coaxial cable, wherein the telephone system protocol signals are translated the fourth frequency band from at least a portion of the second frequency band when the telephone system protocol signals are present on the coaxial cable.

9. The method of claim 8, wherein a plurality of IRDs are coupled to the telephone line by the port coupler, each of the IRDs having an associated client unit coupled between the IRD and the port coupler.

10. The method of claim 9, further comprising translating the telephone system control signals to avoid interference with the satellite control signals travelling on the coaxial cable.

11. The method of claim 10, wherein the client unit is integrated with the IRD.

12. The method of claim 10, wherein the port coupler is integrated with a multiswitch used for distributing the direct broadcast satellite signals.

13. The method of claim 10, wherein the telephone system protocol signals are translated from direct current voltage to a frequency range.

14. The method of claim 10, wherein the frequency range is centered at approximately 15 kilohertz.

15. A system for coupling a modem of an Integrated Receiver Decoder (IRD) to a telephone line via a coaxial cable used for delivering direct broadcast satellite signals to the IRD, comprising:
   a satellite interface for delivering direct broadcast satellite signals to the IRD in a first frequency band and delivering satellite selection signals to a multiswitch via the coaxial cable in a second frequency band; and
   a telephone interface, coupled to the modem of the IRD, for coupling and decoupling telephone system protocol signals and telephone data signals on the coaxial cable, wherein the telephone system protocol signals are transferred to another frequency band from at least a portion of the second frequency band when the telephone system protocol signals are present on the coaxial cable.

16. The system of claim 15, wherein a plurality of IRDs are coupled to the telephone line by the telephone interface.

17. The system of claim 16, wherein the telephone system protocol signals travelling on the coaxial cable are translated to avoid interference with the satellite control signals travelling on the coaxial cable.

18. The system of claim 17, wherein the telephone system protocol signals are translated from direct current voltage to a frequency range.

19. The system of claim 18, wherein the frequency range is centered at approximately 15 kilohertz.

* * * * *